United States Patent
Sakuma

(10) Patent No.: US 11,605,361 B2
(45) Date of Patent: Mar. 14, 2023

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Satoru Sakuma, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/713,604

(22) Filed: Apr. 5, 2022

(65) Prior Publication Data

US 2022/0343874 A1    Oct. 27, 2022

(30) Foreign Application Priority Data

Apr. 27, 2021 (JP) .............................. JP2021-075070

(51) Int. Cl.
G09G 5/00 (2006.01)
G06F 3/16 (2006.01)
G01C 21/36 (2006.01)

(52) U.S. Cl.
CPC ........... *G09G 5/003* (2013.01); *G01C 21/367* (2013.01); *G06F 3/167* (2013.01); *G09G 2340/04* (2013.01); *G09G 2340/14* (2013.01); *G09G 2380/10* (2013.01)

(58) Field of Classification Search
CPC .................................................... G01C 21/367
See application file for complete search history.

(56) References Cited

U.S. PATENT DOCUMENTS

2011/0242136 A1* 10/2011 Yamada ................ G06F 3/0481
345/660
2012/0081281 A1* 4/2012 Morichika ........... G01C 21/367
345/156

FOREIGN PATENT DOCUMENTS

JP         H06-54243 B2      7/1994

* cited by examiner

*Primary Examiner* — Gustavo Polo
(74) *Attorney, Agent, or Firm* — Oliff PLC

(57) ABSTRACT

An information processing apparatus for providing information for a driver of a vehicle, the information processing apparatus comprises a controller configured to execute: receiving message data that includes a message to the driver of the vehicle; when receiving the message data, outputting the message on a display area provided on a screen; and changing a size of the display area where the message is outputted, based on whether the vehicle is traveling or not.

16 Claims, 12 Drawing Sheets

| TRANSMISSION DATE AND TIME | TRANSMITTER | RECEIVER | CLASSIFICATION | TITLE | BODY OF MESSAGE |
|---|---|---|---|---|---|
| ... | XXX MOTORS | VEHICLE X | RECALL INFORMATION | ABOUT RECALL | ... |

FIG. 4

INFORMATION PROCESSING APPARATUS AND INFORMATION PROCESSING METHOD

CROSS REFERENCE TO THE RELATED APPLICATION

This application claims the benefit of Japanese Patent Application No. 2021-075070, filed on Apr. 27, 2021, which is hereby incorporated by reference herein in its entirety.

BACKGROUND

Technical Field

The present disclosure relates to an automobile.

Description of the Related Art

There is a technique for transmitting necessary information to a driver of a vehicle.

For example, Japanese Patent Laid-Open. No. H06-054243 discloses an in-vehicle apparatus that outputs information about inspection of the vehicle after the ignition is turned on and outputs travel-related information after the engine is started.

SUMMARY

An object of the present disclosure is to appropriately provide information for a driver of a vehicle.

The present disclosure in its one aspect provides an information processing apparatus for providing information for a driver of a vehicle, the information processing apparatus comprising a controller configured to execute: receiving message data that includes a message to the driver of the vehicle; when receiving the message data, outputting the message on a display area provided on a screen; and changing a size of the display area where the message is outputted, based on whether the vehicle is traveling or not.

The present disclosure in its another aspect provides an information processing method for providing information for a driver of a vehicle, the method comprising the steps of: receiving message data that includes a message to the driver of the vehicle; when receiving the message data, outputting the message on a display area provided on a screen; and changing a size of the display area where the message is outputted, based on whether the vehicle is traveling or not.

Further, as another aspect, a program for causing a computer to execute the above information processing method or a computer-readable storage medium in which the program is non-transitorily stored is given.

According to the present disclosure, it is possible to appropriately provide information for a driver of a vehicle.

BRIEF DESCRIPTION OF THE DRAWINGS

FIG. 4 is a diagram exemplifying a configuration of message data;

DESCRIPTION OF THE EMBODIMENTS

Figure 1:
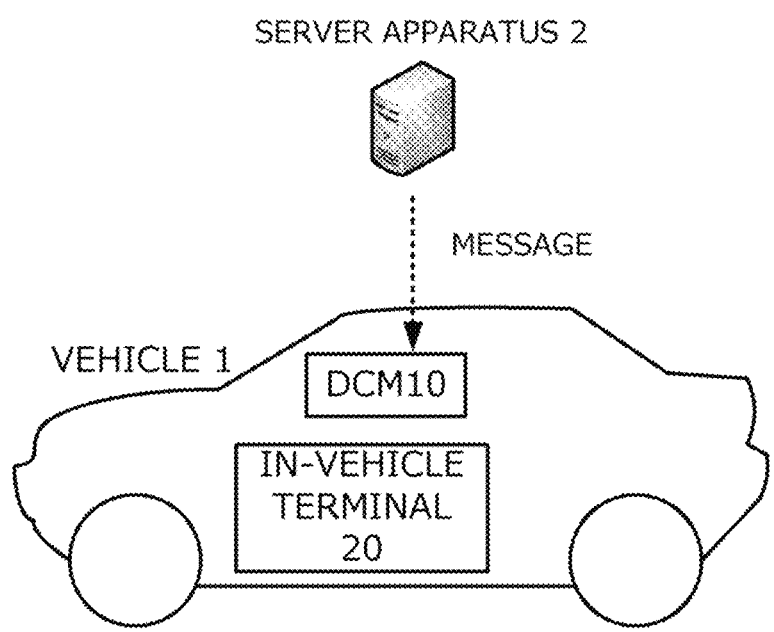
FIG. 1 is a system configuration diagram of a vehicle system according to a first embodiment.

One aspect of the present disclosure is an information processing apparatus for providing information for a driver of a vehicle.

Specifically, the information processing apparatus includes a controller that executes receiving message data that includes a message to the driver of the vehicle, when receiving the message data, outputting the message on a display area provided on a screen, and changing a size of the display area where the message is outputted, based on whether the vehicle is traveling or not.

The message is for the driver of the vehicle (for example, an owner of the vehicle) and is, typically, related to maintenance and inspection of the vehicle. The message may be transmitted from the manufacturer or the dealer of the vehicle. Since there are messages with high importance degrees among messages, such as a recall notification, when the information processing apparatus receives a message, it is necessary to provide the message for the driver at an appropriate timing.

When the information processing apparatus also serves as an information terminal like a car navigation apparatus, the information processing apparatus can output a message via a screen. In such an apparatus, however, since information required for travel may be outputted, safety operation of the vehicle may be interfered with if a message is unconditionally outputted.

In order to solve this problem, the information processing apparatus according to the one aspect of the present disclosure changes the size of the display area where the message is outputted, based on whether the vehicle is traveling or not. For example, when the vehicle is traveling, there is a strong possibility that information related to travel is outputted on the screen, and it is not desirable to attract the driver's attention by a message. On the other hand, when the vehicle is not traveling, it is desirable to positively output a message.

Therefore, bye switching a method for outputting a message according to a traveling state, it is possible to safely and certainly communicate information.

Further, the controller may output the message in a first display mode when the vehicle is not traveling, and outputs the message in a second display mode when the vehicle is traveling.

The second display mode may be a mode in which the size of the display area where the message is outputted is smaller than in the first display mode.

When the vehicle is traveling, by reducing the size of the area where a message is outputted, it is possible to notify existence of the message while continuing to provide the information required for travel.

Further, the controller may omit a part of the message when outputting the message in the second display mode.

The reason is that it is desirable to reduce the amount of outputted information for safety when the vehicle is traveling, in comparison with the case of not traveling.

Further, the message may include a title and a body, and the controller may omit at least a part of the body when outputting the message in the second display mode.

As for omission of the body, a part or all of the body may be omitted. For example, by outputting only the title, only a summary of the message can be notified.

Further, any of a plurality of importance degrees may be associated with the message, and the controller may decide a method for outputting the message based on the importance degree associated with the message.

For example, for a more important message, the message may be outputted by speech or a process of summarizing the message may be performed, in order to rapidly communicate the content.

Further, if the message with the omission exists, the controller may output the omitted message by speech.

According to such a configuration, it is possible to communicate necessary information without interfering with driving.

Further, if the vehicle stops while the message is outputted in the second display mode, the controller may transition the second display mode to a third display mode.

Further, the third display mode may be a mode in which the message is displayed without omission in the second display mode.

When the vehicle is stopped after being in a traveling state, there may be a case where it is not desirable to increase the size of the display area. The reason is that there is a possibility that the information required for traveling is hidden when the size of the display area is increased, even though the vehicle may start again. In such a case, it is desirable to change only the amount of information without changing the size of the display area.

Further, the first display mode may be a mode in which the message is outputted in the display area that is arranged on the full screen, and the second display mode may be a mode in which the message is outputted in the display area that is overlaid on a part of content other than the message.

As the content other than the message, for example, navigation-related information, traffic information, road map information, TV broadcasting and the like are given.

Further, the controller may receive the message data at a timing when an ignition of the vehicle is turned on.

According to such a configuration, it is possible to certainly notify the driver of the vehicle of a message. When there is a received message for which a confirmation operation has not been performed, the message may be outputted again at the timing when the ignition of the vehicle is turned on.

Embodiments of the present disclosure will be explained below based on drawings. Configurations of the embodiments below are exemplifications, and the present disclosure is not limited to the configurations of the embodiments.

First Embodiment

An outline of a vehicle system according to a first embodiment will be explained with reference to FIG. 1. The vehicle system according to the present embodiment is configured including a vehicle 1 and a server apparatus 2 that transmits a message to a driver of the vehicle 1.

The vehicle 1 is a connected car having a function of communicating with external apparatuses. The vehicle 1 is configured including a DCM (Data Communication Module) 10 and an in-vehicle terminal 20.

The DCM 10 is an apparatus that performs wireless communication with other apparatuses (or an external network) via a network. The DCM 10 functions as a gateway for connecting a component that the vehicle 1 has (hereinafter, a vehicle component) to a network outside the vehicle. For example, the DCM 10 provides access to the external network for the in-vehicle terminal 20 that the vehicle 1 has. Thereby, the in-vehicle terminal 20 can perform communication with an external apparatus via the DCM 10.

The in-vehicle terminal 20 is an information terminal mounted on the vehicle 1. The in-vehicle terminal 20 is also called an infotainment terminal, and has a function of providing information (for example, traffic information and route guidance) and entertainment (for example, music and moving images) for a driver of a vehicle. The in-vehicle terminal 20 may be a terminal that functions alone like a car navigation apparatus or may be a terminal having a function of cooperating with a smartphone or the like.

The in-vehicle terminal 20 has a function of, when receiving a message transmitted by the server apparatus 2, via the DCM 10, providing the message for the driver of the vehicle. As the message transmitted by the server apparatus 2, there is, for example, a message related to maintenance and inspection of the vehicle. Thereby, the user of the vehicle 1 can obtain necessary information about the vehicle.

The server apparatus 2 is an apparatus that manages a plurality of vehicles 1. The server apparatus 2 may be an apparatus that an automobile manufacturer, a car dealer or the like is responsible for. The server apparatus 2 stores, for example, maintenance plans and the like for the managed plurality of vehicles 1 and transmits messages and the like related to maintenance (for example, an oil change timing) to the vehicles 1 at appropriate timings. Further, the server apparatus 2 transmits an urgent message to the vehicles 1 as necessary. As such a message, there is a notification related to safety such as a recall notification.

Components of the system will be explained in detail.

Figure 2:
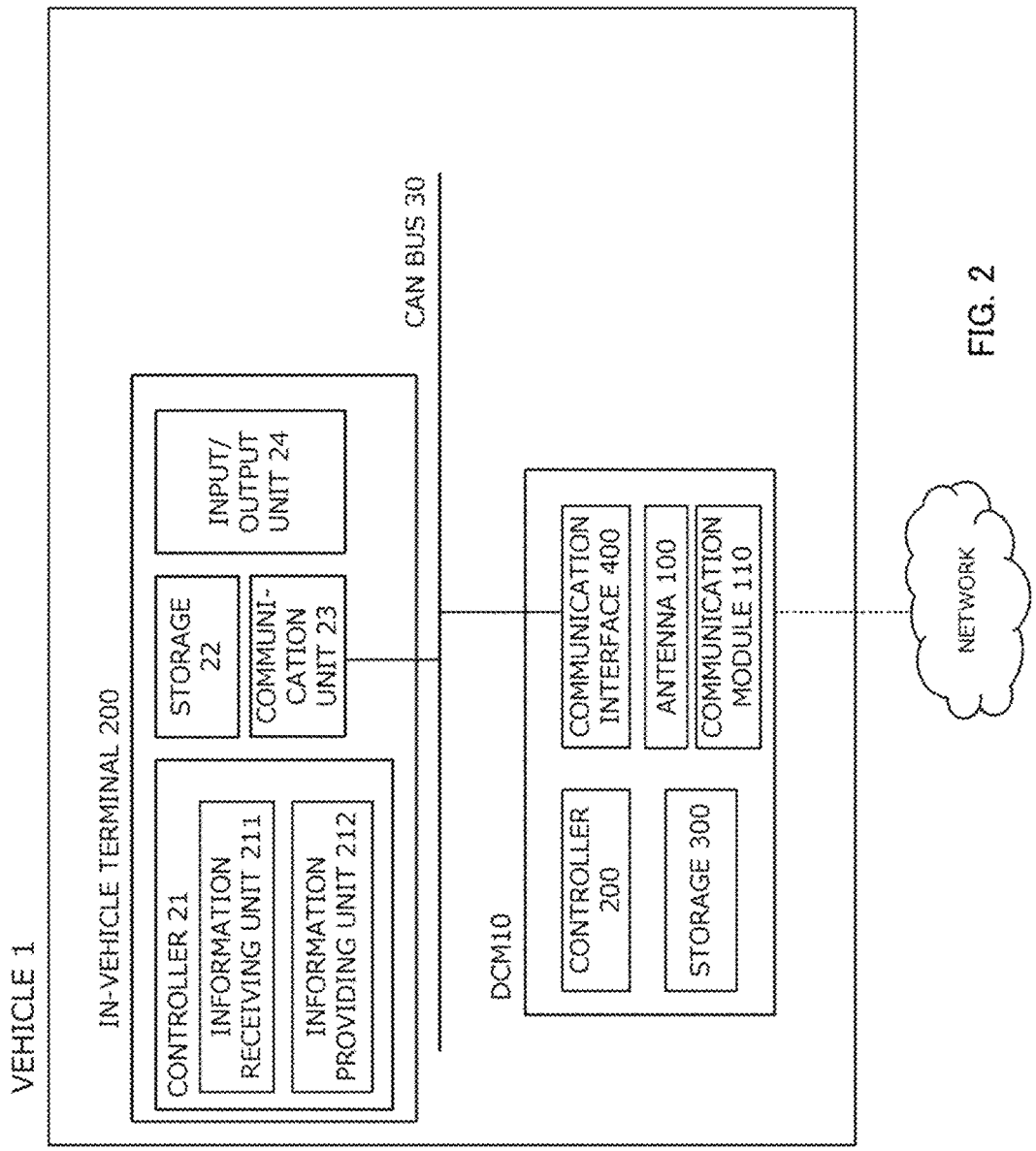
FIG. 2 is a block diagram illustrating components that a vehicle has.

FIG. 2 is a block diagram schematically illustrating an example of a configuration of the vehicle 1 illustrated in FIG. 1. The vehicle 1 is configured having the DCM 10 and the in-vehicle terminal 20. These components are mutually connected via a CAN bus 30 which is an in-vehicle network bus. Though the DCM 10 and the in-vehicle terminal 20 are exemplified as apparatuses connected to the in-vehicle network in this example, a plurality of electronic control units that are responsible for control of the vehicle, such as an engine ECU and a body ECU, may be mounted on the vehicle 1.

The DCM 10 is an interface unit that connects the in-vehicle network and a communication network outside the vehicle 1. Hereinafter, the communication network outside the vehicle 1 will be referred to simply as the network or the external network. As the external network, for example, a wide area network such as the Internet is given.

The DCM 10 is configured having an antenna 100, a communication module 110, a controller 200, a storage 300 and a communication interface 400.

The antenna 100 is an antenna element that performs input/output of wireless signals. In the present embodiment, the antenna 100 is compatible with cellular communication (for example, mobile communication such as 3G, LTE and 5G). The antenna 100 may be configured including a plurality of physical antennas. For example, in the case of performing mobile communication using radio waves in the high frequency band, such as microwaves and millimeter waves, the plurality antennas may be distributedly arranged in order to stabilize communication.

The communication module 110 is a communication module for performing mobile communication.

The controller 200 is an operation unit that realizes various kinds of functions of the DCM 10 by executing a predetermined program. The controller 200 can be realized, for example, by a CPU or the like.

The storage 300 is a memory device that includes a main memory and an auxiliary storage device. In the auxiliary storage device, an operating system (OS), various kinds of programs, various kinds of tables and the like are stored, and each function to be described later corresponding to a predetermined purpose can be realized by loading a program stored in the auxiliary storage to the main memory and executing the program.

The controller 200 executes a function of mediating communication performed between the external network and a component that the vehicle 1 has (a vehicle component). For example, when a certain vehicle component requires communication with the external network, the controller 200 executes a function of relaying data transmitted from the vehicle component to the external network. Further, the controller 200 executes a function of receiving data transmitted from the external network and transferring the data to an appropriate vehicle component.

Furthermore, the controller 200 can execute functions specific thereto. For example, the controller 200 is configured no be capable of executing a security system monitoring function and a telephone call function, and can make a security report, an emergency report or the like based on a trigger that has occurred in the vehicle.

The communication interface 400 is an interface unit that connect the DCM 10 to the in-vehicle network. In the present embodiment, the plurality of vehicle components including the in-vehicle terminal 20 are mutually connected via the CAN bus 30. As a standard for the in-vehicle network, for example, CAN (Controller Area Network) can be exemplified. When the in-vehicle network uses a plurality of standards, the communication interface 400 may have a plurality of interface devices corresponding to standards for communication destinations. Communication standards other than CAN, for example, Ethernet (registered trademark) and the like can be exemplified.

Figure 3:
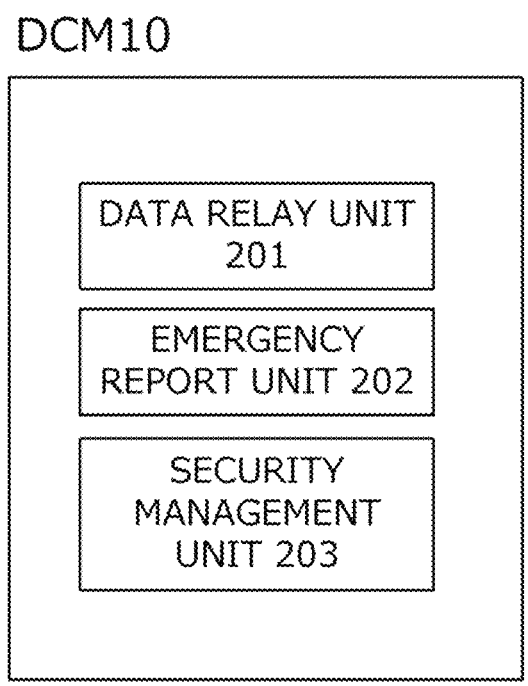
FIG. 3 is a block diagram illustrating a module configuration of a DCM.

Next, functions executed by the controller 200 will be explained. FIG. 3 is a diagram illustrating function modules that the DCM 10 has. The illustrated function modules can be realized by executing a program stored in storage unit such as a ROM by the CPU or the like.

A data relay unit 201 relays data transmitted and received among the vehicle components. For example, the data relay unit 201 executes a process of receiving data sent by a first apparatus connected to the in-vehicle network and transferring the data to a second apparatus connected to the in-vehicle network as necessary. Each of the first and second apparatus may be the in-vehicle terminal 20 or another vehicle component. Further, when receiving data addressed to the external network from a vehicle component, the data relay unit 201 relays the data to the external network. Further, due data relay unit 201 receives data transmitted from the external network and transfers the data to an appropriate vehicle component.

An emergency report unit 202 makes an emergency report, to an operator outside the vehicle when an abnormal situation occurs on the vehicle 1. As an example of the emergency situation, occurrence of a traffic accident or a vehicle breakdown is given. For example, when a predetermined trigger such as a press on a call button provided in the vehicle 1 or development of an airbag occurs, the emergency report unit 202 starts connection to the operator to enable conversation between the driver of the vehicle and the operator. At the time of the emergency report, the emergency report unit 202 may transmit position information about the vehicle to the operator. In this case, the emergency report unit 202 may acquire the position information from an in-vehicle GPS module.

A security management unit 203 performs a security monitoring process. For example, based on data received from an ECU that is responsible for the electronic lock of the vehicle, the security management unit 203 detects that the vehicle has been unlocked not according to a regular procedure, and transmits a security report to a predetermined apparatus. The security report may include the position information about the vehicle. In this case, the security management unit 203 may acquire the position information from the in-vehicle GPS module. The security management unit 203 may be adapted to, when judging that a security problem has occurred in the vehicle, acquire the position information and periodically transmit the acquired position information to an external apparatus specified in advance.

Next, the in-vehicle terminal 20 will be explained.

The in-vehicle terminal 20 is an apparatus that provides information for the driver of the vehicle 1 and is also called a car navigation system, an infotainment system or a head unit. The in-vehicle terminal 20 can provide navigation and entertainment for the driver of the vehicle. Further, the in-vehicle terminal 20 has a function of downloading traffic information, road map data, music, moving images and the like by communicating with the external network outside the vehicle 1.

The in-vehicle terminal 20 can be configured with a general-purpose computer. That is, the in-vehicle terminal 20 can be configured as a computer that has processors such as a CPU and a GPU, a main memory such as a RAM and a ROM, auxiliary storage devices such as an EPROM, a hard disk drive and a removable medium. In the auxiliary storage device, an operating system (OS), various kinds of programs, various kinds of tables and the like are stored, and each function to be described later corresponding to a predetermined purpose can be realized by executing a program stored in the auxiliary storage. A part or all of the functions may be realized by a hardware circuit such as an ASIC or an FPGA.

The in-vehicle terminal 20 is configured having a controller 21, a storage 22, a communication unit 23 and an input/output unit 24.

The controller 21 is a unit configured to control the in-vehicle terminal 20. The controller 21 is configured with information processing units, for example, a CPU (Central Processing Unit), a GPU (Graphics Processing Unit) and the like.

The controller 21 has an information receiving unit 211 and an information providing unit 212 as function modules. Each function module may be realized by executing a program stored in storage unit such as the ROM by the CPU.

The information receiving unit 211 receives a message transmitted from the server apparatus 2 via the DCM 10. She message is typically a message related to maintenance and inspection about the vehicle as described above.

FIG. 4 illustrates an example of a format of the message (message data) that the information receiving unit 211 receives. As illustrated in FIG. 4, the message includes a transmission date and time, an identifier of a transmitter, an identifier of a receiver, a classification, title, a body and the like.

The information receiving unit 211 inquires of the server apparatus 2 whether there is a message or not at a predetermined timing and, if there is message addressed to its own vehicle, receives the message. The predetermined timing can be, for example, a timing when the ignition of the vehicle 1 is turned on. When receiving a message, the information receiving unit 211 transfers the message to the information providing unit 212 to be described later.

Figure 5:
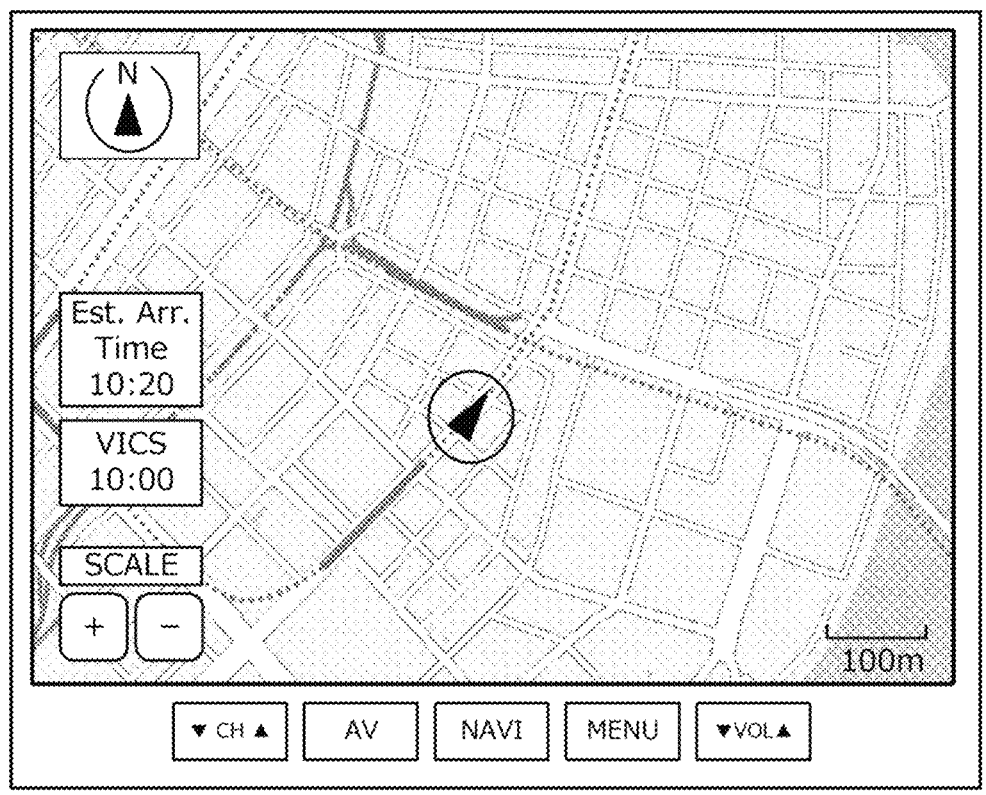
FIG. 5 is a diagram illustrating an example of navigation-related information.

The information providing unit 212 provides information for the driver of the vehicle. As the provided information, for example, traffic information, navigation information, music and moving images, radio broadcasting, digital TV broadcasting and the like are given. FIG. 5 illustrates an example of information provided for the driver while the vehicle is traveling (navigation-related information). The information providing unit 212 outputs such information via the input/output unit 24.

Furthermore, when receiving a message transmitted from the server apparatus 2, the information providing unit 212 provides the information for the user of the vehicle 1.

Figure 6:
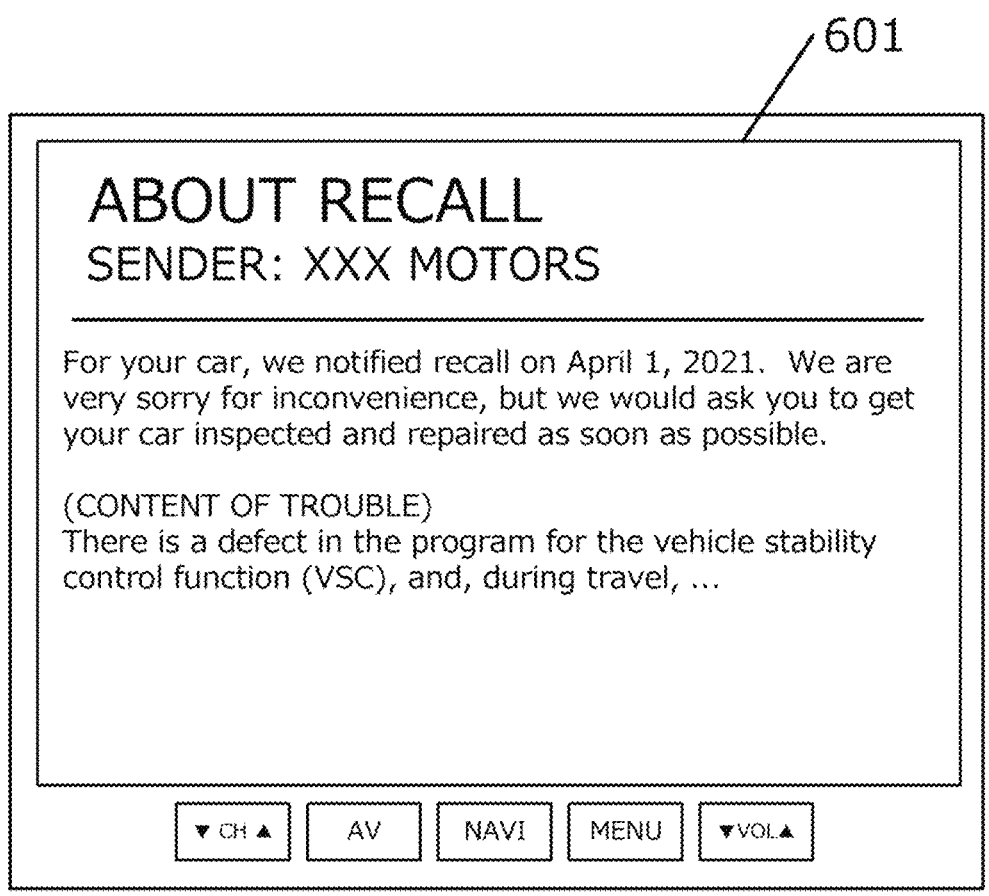
FIG. 6 is a diagram explaining a first display mode.

The information providing unit 212 can output the content of a message in two display modes, a first display mode and a second display mode. FIG. 6 illustrates an example of outputting the content of a message in the first display mode. In the first, display mode, a message is outputted using a display area arranged on the full screen (reference sign 601) excluding an interface for performing operations. In the first display mode, all operations including a scroll operation can be performed.

Figure 7:
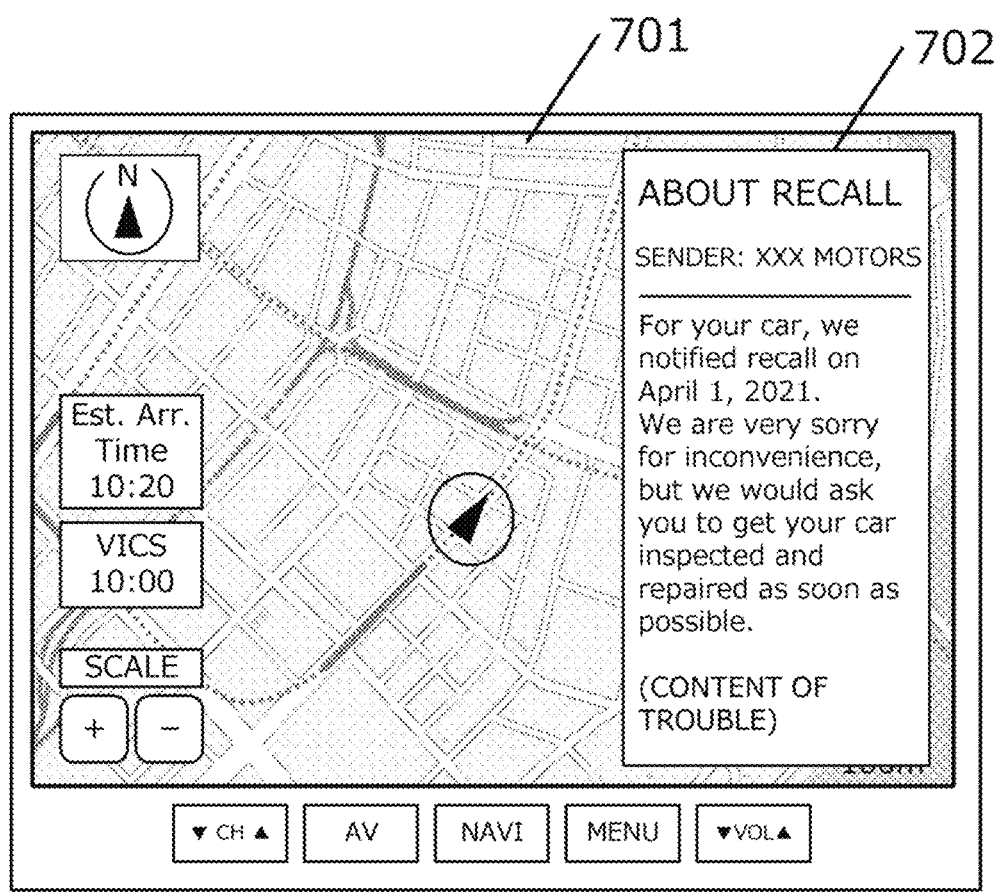
FIG. 7 is a diagram explaining a second display mode.

At a timing when interference with driving should not be performed, the information providing unit 212 outputs the content of a message in the second display mode. FIG. 7 illustrates an example of the second display mode. In the second display mode, the display area in the first display mode is reduced, and a message is outputted using the reduced display area. The reduced display area is overlay-displayed (reference sign 702) on information outputted by the in-vehicle terminal 20 (indicated by reference sign 701; for example, navigation-related information).

A display mode selection method will be described later.

The storage 22 is a unit configured to store information and is configured with a storage medium such as a RAM, a magnetic disk or a flash memory. In the storage 22, various kinds of programs executed by the controller 21, data used by the programs and the like are stored.

The communication unit 23 is a communication interface that connects the in-vehicle terminal 20 to the in-vehicle network (the CAN bus 30).

The input/output unit 24 is unit configured to accept an input operation performed by the user and presenting information to the user. Specifically, the input/output unit 24 is configured with a touch panel and control unit therefor, and a liquid crystal display and control unit therefor. The touch panel and the liquid crystal display are configured with one touch panel display in the present embodiment.

Further, the input/output unit 24 may have a speaker or the like for outputting speech. For example, when the information receiving unit 211 receives a message, the input/output unit 24 outputs speech and displays the content thereof on the liquid crystal display.

The CAN bus 30 is a communication bus constituting the in-vehicle network based on the CAN (Controller Area Network) protocol. Though one CAN bus 30 is illustrated in this example, the in-vehicle network may have a plurality of communication buses. Further, the in-vehicle network may have a gateway that mutually connects the plurality of communication buses.

Figure 8:
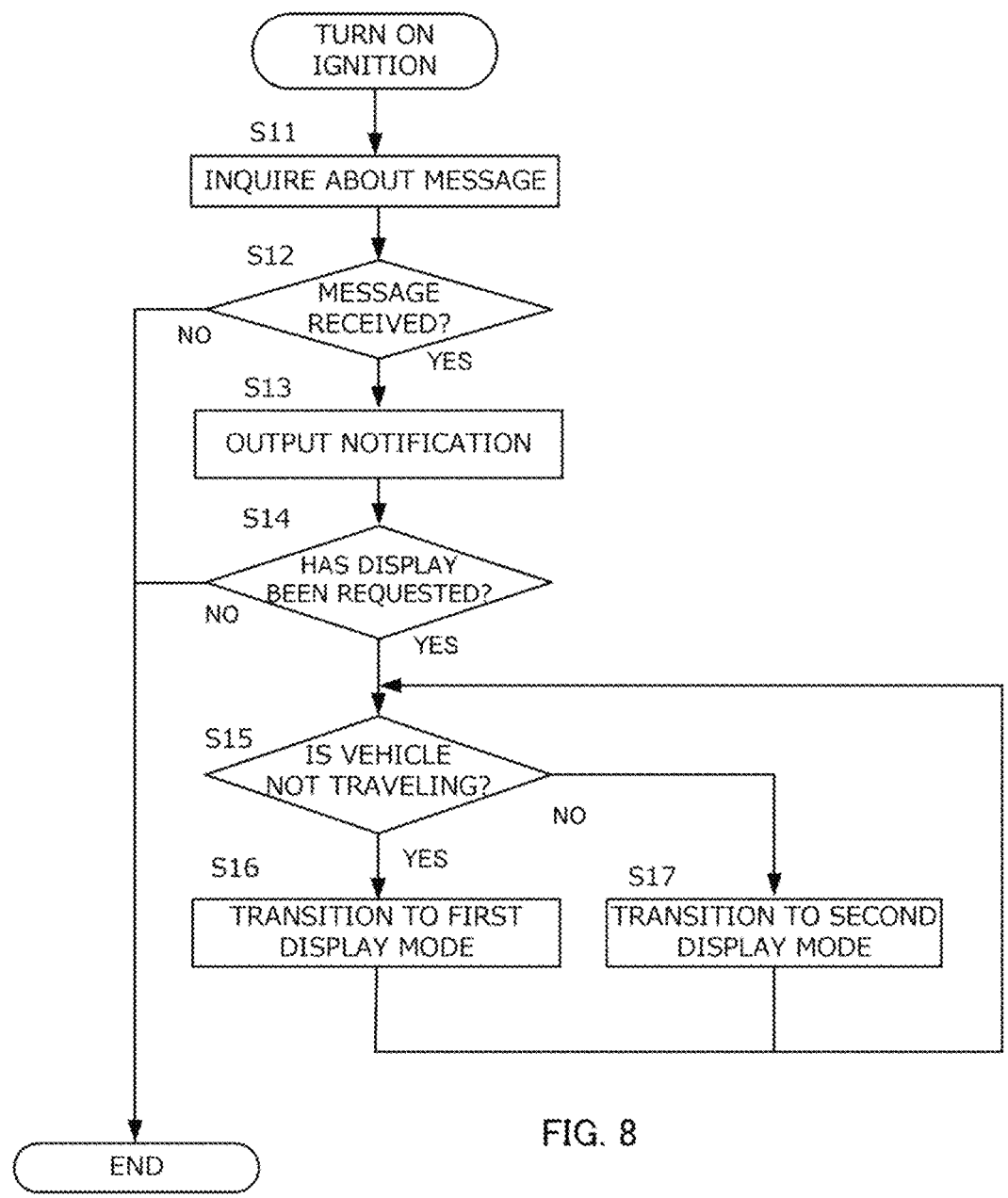
FIG. 8 is a flowchart of a process executed by an in-vehicle terminal in the first embodiment.

Next, a process of the in-vehicle terminal 20 (the controller 21) receiving a message and outputting the message will be explained. FIG. 8 is a flowchart of the process executed by the controller 21. The process is started when the ignition of the vehicle is turned on.

First, at step S11, the information receiving unit 211 connects to the server apparatus 2 and inquires the server apparatus 2 whether there is message addressed to its own vehicle or not. If there is a message, the information receiving unit 211 downloads the message.

Next, at step S12, the information providing unit 212 judges whether the received message exists or not. If a positive judgment is made at this step, the process transitions to step S13. If a negative judgment is made at this step, the process ends.

Figure 9:
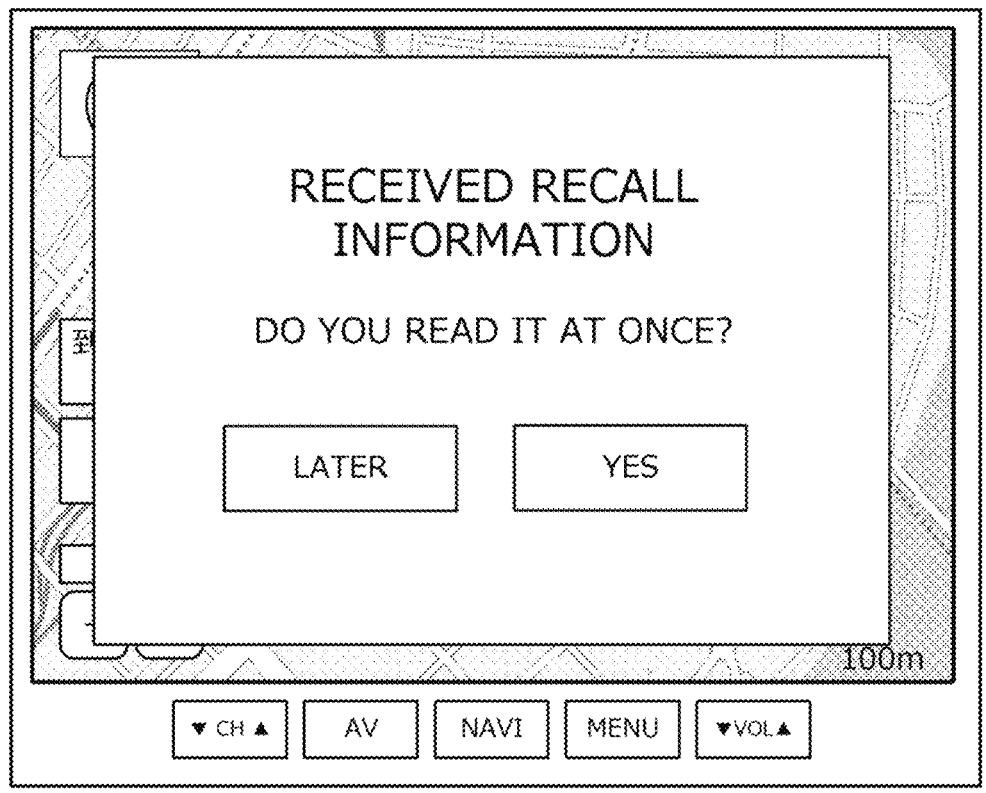
FIG. 9 illustrates an example of notification of new arrival of a message.

At step S13, the information providing unit 212 outputs a notification to the effect that there is a newly arrived message (a new arrival notification). At this step, information based on the classification of the message (for example, "There is information about recall") is generated and outputted. Further, a selection about whether the message is to be opened or not is accepted. FIG. 9 illustrates an example of the new arrival notification.

At step S14, it is judged whether the user has requested display of the message or not. For example, if the user selects to read the message in response to the new arrival notification a positive judgment is made for this step, and the process transitions to step S15. If a negative judgment is made at this step, the process ends.

At step S15, it is judged whether the vehicle is not traveling. At this step, it is judged whether the vehicle 1 is not traveling, for example, based on data acquired from a vehicle speed sensor that the vehicle 1 has. If a negative judgment is made at this step (that is, if the vehicle is traveling), the process transitions to step S17. If a positive judgment is made at this step (that is, if the vehicle is not traveling), the process transitions to step S16.

At step S16, the content of the received message is displayed in the first display mode. That is, the content of the message is displayed using a display area arranged on the full screen as illustrated in FIG. 5. If the vehicle is not traveling after the ignition is turned on, the process transitions to step S16, and display of the message on the full screen is performed.

At step S17, the content of the received message is displayed in the second display mode. That is, the content of the message is displayed using a display area arranged on a part of the screen as illustrated in FIG. 6. If the vehicle starts before it is requested to display the message after the ignition is turned on, the process transitions to step S17, where display of the message on the reduced display area is performed.

As explained above, when receiving a message from the server apparatus 2, the in-vehicle terminal 20 according to the first embodiment changes the size of the display area where the message is outputted, according to whether the vehicle 1 is traveling or not. Thereby, it is possible to notify existence of a message without interfering with provision of information (for example, navigation-related information) by the in-vehicle terminal 20.

In the present embodiment, whether there is a newly arrived message or not is checked at a timing when the ignition is turned on. However, acquisition of a message may be performed at a different timing. For example, acquisition of a message may be periodically attempted while the vehicle system is operating.

Further, for example, if a message notified to the driver is not read, for example, in the case where a negative judgment is made at step S14, the notification may be made again at the next and succeeding message acquisition timings (for example, at a timing when the ignition is turned on). Whether a message has been read or not may be judged based on an operation by the user. For example, when the user indicates that he has read the message or when the entire message is displayed, it may be judged that the message has been read.

Second Embodiment

In the first embodiment, while the vehicle 1 is traveling, a message is outputted using a reduced display area as illustrated in FIG. 7. However, there may be a case where it is desirable not to display the detailed content of a message itself while the vehicle is traveling. The present embodiment is an embodiment in which, in order to respond to such a case, the amount of outputted information is reduced when the vehicle is traveling.

Figure 10:
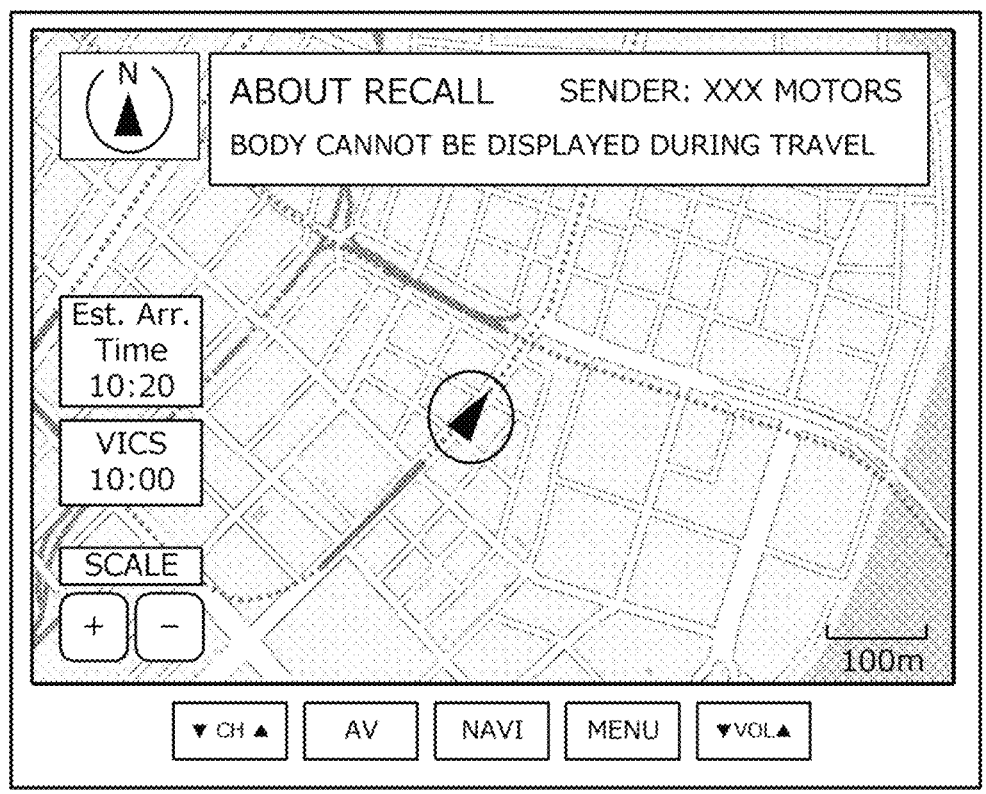
FIG. 10 illustrates an example of display of a message in a second embodiment.

In the present embodiment, a message is displayed with a part of the message being omitted, in the second display mode as exemplified in FIG. 10. Though the entire body of the message is omitted in this example, the method for omitting a part of a message is not limited thereto. For example, by summarizing the body of a message, sentences after the summarization may be displayed, or only a predetermined number of characters at the beginning of the body may be displayed.

By reducing the amount of outputted information in this way, it is possible to ensure safety during travel.

Third Embodiment

In the second embodiment, when the vehicle is traveling, a message is displayed with a part of the message being omitted. In such a form, when the vehicle stops, the display changes to full screen display, and the entire message can be confirmed.

However, when the vehicle 1 temporarily stops and may start again, there may be a case where full screen display is not desirable. Therefore, in a third embodiment, when the vehicle transitions from a traveling state to a stopped state, only the amount of outputted information is changed without changing the size of the display area.

Figure 11:
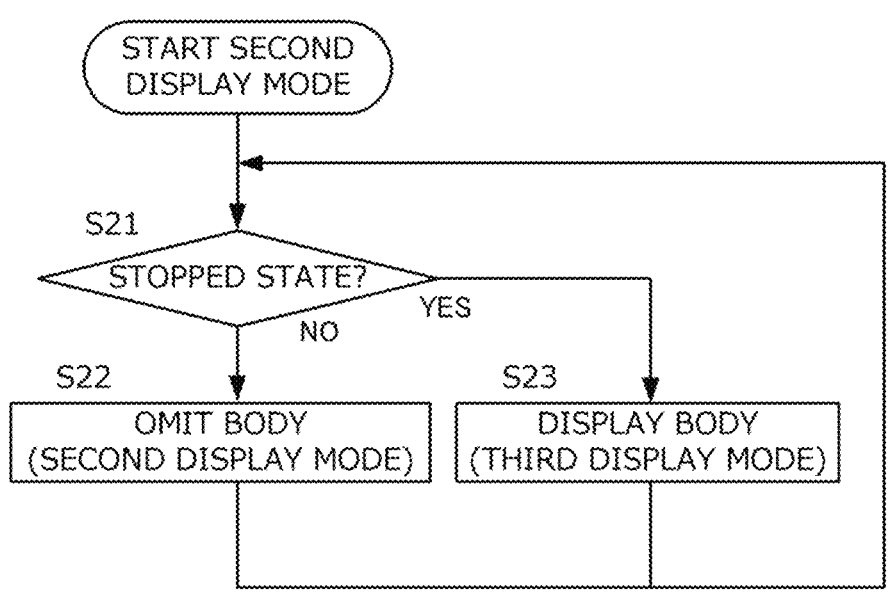
FIG. 11 is a flowchart of a process executed by an in-vehicle terminal in the second embodiment.

In the present embodiment, when output of a message is started in the second display mode at step S17, a process illustrated in FIG. 11 is started next.

Figure 12:
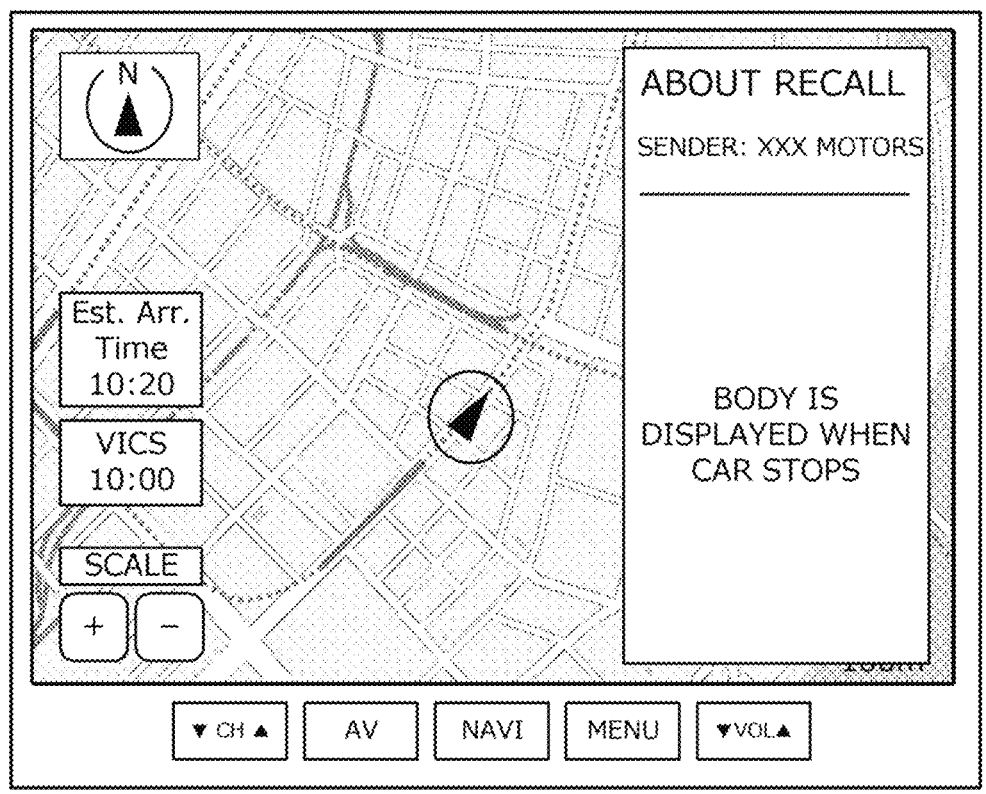
FIG. 12 illustrates an example of display of a message in a third embodiment.

At step S21, it is judged whether the vehicle is not traveling. If it is judged that the vehicle is traveling, the process transitions to step S22, and a body is omitted, with the size of the display area being kept as it is. In the present embodiment, the second display mode is a mode in which a message is outputted using a reduced display area, and the content is omitted. FIG. 12 illustrates an example in which the body is omitted from the screen illustrated in FIG. 7. When the apparatus is already in the second display mode, the second display mode is continued.

On the other hand, if it is judged that the vehicle is not traveling at step S21, the process transitions to step S23, and the body is displayed, with the size of the display area being kept as it is. That is, the content of the message is outputted on a screen as illustrated in FIG. 7.

A mode in which, though a message is outputted using a reduced display area, the content is not omitted is referred to as a third display mode.

The process of steps S21 to S23 is repeatedly executed. That is, when the vehicle repeats stopping and starting, display and omission of the body are repeated.

Thus, in the third embodiment, if the vehicle is traveling at the time of displaying a message for the first time, the message is not full-screen displayed, but only the amount of information is switched. According to such a form, it becomes possible to communicate a message without interfering with output of the information required for travel.

Fourth Embodiment

In the second and third embodiments, the body of a message is hidden when the vehicle is traveling. In the embodiments, however, an important message cannot be communicated until the vehicle 1 stops. In order to cope therewith, the omitted content of the message may be communicated to the driver using other units than the display so as not to interfere with driving.

In the present embodiment, for example, at least a part of a message is omitted, the omitted part is outputted by speech. For example, if the input/output unit 24 includes a speaker and a speech synthesis unit, it is possible to output speech using these units. Thereby, it is possible to communicate the content of the message to the driver without interfering with driving. When all the output of the omitted message by the speech is completed, the message may be in a read state.

(Modifications)

The above embodiments are mere examples, and the present disclosure can be appropriate changed and practiced within a range not departing from the spirit of the disclosure.

For example, the processes and units explained in the present disclosure can be freely combined and implemented as far as technical contradiction does not occur.

Further, importance degrees may be associated with messages, and switching may be performed among methods for outputting the messages, according to an importance degree. For example, methods of "a message with a higher importance degree being unconditionally outputted in the first display mode", "a message with a medium importance degree being outputted using a speech" and "a message with a low importance degree being caused to be confirmed after a vehicle stops" can be adapted.

In addition, the processing described as being performed by one device may be shared and executed by a plurality of devices. Alternatively, the processing described as being performed by different devices may executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions, such as read-only memory (ROM), random access memory (RAM), EPROM, EEPROM, magnetic cards, flash memory, and optical cards.

What is claimed is:

1. An information processing apparatus for providing information for a driver of a vehicle, the information processing apparatus comprising:
a controller configured to:
receive message data that includes a message to the driver of the vehicle;
when receiving the message data, output the message on a display area provided on a screen;
change a size of the display area where the message is output, based on whether the vehicle is traveling or not; and
output the message in a first display mode when the vehicle is not traveling, and output the message in a second display mode when the vehicle is traveling, wherein
the second display mode is a mode in which the size of the display area where the message is outputted is smaller than in the first display mode.

2. The information processing apparatus according to claim 1, wherein
the controller is configured to omit a part of the message when outputting the message in the second display mode.

3. The information processing apparatus according to claim 2, wherein
the message includes a title and a body; and
the controller is configured to omit at least a part of the body when outputting the message in the second display mode.

4. The information processing apparatus according to claim 2, wherein
any of a plurality of importance degrees is associated with the message; and
the controller is configured to decide a method for outputting the message based on the importance degree associated with the message.

5. The information processing apparatus according to claim 2, wherein
if the message with an omission exists, the controller is configured to output an omitted message by speech.

6. The information processing apparatus according to claim 2, wherein
if the vehicle stops while the message is output in the second display mode, the controller is configured to transition the second display mode to a third display mode.

7. The information processing apparatus according to claim 6, wherein
the third display mode is a mode in which the message is displayed without omission in the second display mode.

8. The information processing apparatus according to claim 1, wherein
the first display mode is a mode in which the message is outputted in the display area that is arranged on a full screen; and
the second display mode is a mode in which the message is outputted in the display area that is overlaid on a part of content other than the message.

9. The information processing apparatus according to claim 8, wherein
the content is navigation-related information.

10. The information processing apparatus according to claim 1, wherein
the controller is configured to receive the message data at a timing when an ignition of the vehicle is turned on.

11. The information processing apparatus according to claim 10, wherein
the controller is configured to accept a confirmation operation responding to the received message from the driver; and
if there is a message for which the confirmation operation has not been performed, the controller is configured to output the message again at the timing when the ignition of the vehicle is turned on.

12. An information processing method for providing information for a driver of a vehicle, the method comprising:
receiving message data that includes a message to the driver of the vehicle;
when receiving the message data, outputting the message on a display area provided on a screen;
changing a size of the display area where the message is outputted, based on whether the vehicle is traveling or not; and
outputting the message in a first display mode when the vehicle is not traveling, and outputting the message in a second display mode when the vehicle is traveling, wherein
the second display mode is a mode in which the size of the display area where the message is output is smaller than in the first display mode.

13. The information processing method according to claim 12, wherein
a part of the message is omitted when the message is output in the second display mode.

14. The information processing method according to claim 13, wherein
the message includes a title and a body; and
at least a part of the body is omitted when the message is output in the second display mode.

15. The information processing method according to claim 13, wherein
if the vehicle stops while the message is output in the second display mode, the second display mode transitions to a third display mode.

16. The information processing method according to claim 15, wherein
the third display mode is a mode in which the message is displayed without omission in the second display mode.

* * * * *